United States Patent [19]
Fesler et al.

[11] Patent Number: 5,095,736
[45] Date of Patent: Mar. 17, 1992

[54] PORTABLE GAS CYLINDER SAFETY DELIVERY SYSTEM

[75] Inventors: Richard Fesler; Jim Nielsen, both of Boise, Id.

[73] Assignee: Micron Techology, Inc., Boise, Id.

[21] Appl. No.: 526,081

[22] Filed: May 10, 1990

[51] Int. Cl.⁵ .................................................. G01M 3/00
[52] U.S. Cl. .................................... 73/23.2; 73/493;
312/209; 312/250; 340/605; 340/632
[58] Field of Search ............... 73/37, 40, 40.7, 49.2 R,
73/49.3; 340/603, 605, 632; 141/94, 97, 83;
312/31, 31.1, 31.0, 31.3, 209, 250; 414/410

[56] References Cited

U.S. PATENT DOCUMENTS

| | | | |
|---|---|---|---|
| 2,667,397 | 1/1954 | Hallisey | 312/250 |
| 3,357,257 | 12/1967 | Herndon et al. | 73/40.7 |
| 4,158,960 | 6/1979 | White et al. | 73/49.3 |
| 4,253,716 | 3/1981 | Turner, Jr. | 312/250 |
| 4,636,475 | 1/1987 | Price et al. | 73/49.2 |
| 4,802,515 | 2/1989 | Pytryga et al. | 141/97 |

Primary Examiner—Hezron E. Williams
Assistant Examiner—Michael J. Brock
Attorney, Agent, or Firm—Wayne E. Duffy

[57] ABSTRACT

The present invention relates to a portable gas cylinder safety containment system removably and operably incorporated with a portable, self powered, toxic gas monitoring system, and both removably attached to a delivery cart system, to provide real time monitoring of the delivery cart contents while in transit. This system is designed particularly for the safe transport between storage and work areas of toxic and hazardous gases used in various research, laboratory and production process, such as those in the semiconductor and microcircuit industries.

2 Claims, 2 Drawing Sheets

PORTABLE GAS CYLINDER SAFETY DELIVERY SYSTEM

FIELD OF THE INVENTION

The present invention relates to a portable gas cylinder safety containment system removably and operably incorporated with a portable toxic gas monitoring system and both removably attached to a delivery cart system, to provide real time monitoring of the delivery cart contents while in transit. This system is designed to meet or exceed National, State or Local Uniform Building Code (UBC) and Uniform Fire Code (UFC) requirements related to the safe transport between storage and work areas of toxic and hazardous gases used in various research, laboratory or production processes, particularly those in the semiconductor and microcircuit industries.

DESCRIPTION OF THE PRIOR ART

Prior art in the field of this invention has generally been initiated, guided and controlled by the requirements of relevant UBC and UFC regulations rather than individual industry concerns. Current, approved methods for the safe handling and transportation of hazardous production materials (HPM) to and from fabrication areas in semiconductor and microcircuit production facilities commonly employ enclosed piping or tubing systems. When relatively small quantities of toxic or hazardous gases are being moved, they often are contained in small pressurized cylinders of conventional design and hand carried or transported in conventional, open hand trucks or carts from storage rooms through service or exit corridors to fabrication areas. When the hazardous materials reach the fabrication area they are placed in monitored, protective enclosures or work stations and incorporated in an appropriate manner into the particular fabrication process.

For the purposes of this discussion: A fabrication area is an area where there are processes involving hazardous production materials and may include ancillary rooms or areas such as dressing rooms and offices that are directly related to the fabrication area processes. A hazardous production material (HPM) is a solid, liquid or gas that has a certain specified degree of hazard rating in health, flammability or reactivity as ranked by specific UFC or UBC standards and which is used directly in research, laboratory or production processes which have as their end product materials which are not hazardous. A hazardous production material storage room is a room used for the storage or dispensing of hazardous production materials. A work station is a defined space or an independent principal piece of equipment using hazardous production materials within a fabrication area where a specific function, a laboratory procedure or a research activity occurs. Approved cabinets serving the work station shall be defined as a part of the station. The station may contain ventilation equipment, fire protection devices and other processing and scientific equipment. A service corridor is a fully enclosed passage, which may be distinct from or as a part of the fabrication area, used for transporting hazardous production materials and purposes other than required exiting. An exit corridor is intended only for ingress and egress of people.

Article 80, sections 107-109 of the Uniform Fire Code and the 1985 UBC/UFC Design Guide for Group H, Division 6 Occupancies, which are defined therein, apply generally to laboratory, research and production facilities such as those in the semiconductor and microcircuit industries. The Design Guide discusses the merits and implementation of applicable UBC and UFC sections. For example, UFC Section 51.108(a) provides that, in new buildings, hazardous production materials shall not be permitted. Instead, a service corridor shall be required. However, recognizing potential extreme economic hardship in retrofitting existing buildings, other code provisions have been added to allow, but control, the continued use of an existing corridor system for the transport of HPM. Specific controls include, but are not limited to: (1) All containers must be an approved type. (2) Quantity to be transported is restricted. (3) No storage or dispensing in the corridor is permitted. (4) An approved cart may be used to increase quantities transported.

UFC Section 51.108(b)1 provides, in part, that transportation of materials by hand is limited to original shipping containers, or other approved containers, such as safety cans or safety carriers. Conventional carts or trucks do not provide the desired degree of limiting the exposure. However UFC Section 51.108(b)2 provides an exception which declares that cylinders of HPM gases may be transported by acceptable gas cylinder hand trucks. Cylinders not exceeding 25 pounds may be hand carried. The cart or truck is to be designed with adequate controls to limit potential exposures in the corridor system. The section provides further that HPM cylinders in transit shall have their valves capped or plugged with an approved closure device in addition to having their protective cylinder caps in place. Cylinders placed on carts and trucks shall be individually restrained to prevent accidental dislodgement.

Small gas cylinders, called "lecturn or lecture bottles" are not typically supplied with valve protective caps. They are boxed in small wooden crates to provide valve protection. If these cylinders cannot be transported to the use area in the original shipping container, another suitable container must be provided to protect the cylinder valve during transport.

UFC Section 51.108(c)1 provides, in part, that carts and trucks shall be designed to provide a stable base for the commodities to be transported and shall be provided with a device which will enable the operator to safely control movement by providing stops or speed reduction devices.

UFC Section 51.108(c)3 provides that neither the length nor the width of a cart shall exceed 48 inches nor one-half the width of existing exit corridors, whichever is more restrictive. The types of trucks or carts that may be used in a service corridor are not regulated by the code but many of the design criteria for carts and trucks to be used in existing exit corridors will still apply from a practical standpoint. UFC Section 51.109(a)2 provides, in part, that when carts or trucks are used, the minimum width of a service corridor shall be 33 inches wider than the widest cart or truck.

When exit corridors are being used for transport of HPM, UFC Section 51.108(c) provides that the capacity of carts and trucks shall not exceed: liquids—55 gallons, gases—7 cylinders (up to 400 pounds each), solids—500 pounds.

When service corridors are being used for a like purpose, the maximum quantities of HPM that may be transported at one time may be two times the amounts specified for exit corridors. The material must still be in approved containers but the vehicle need not be an "approved cart". Carts of ordinary design may be used. The cart capacity limits are considered to be the safe maximum amounts of HPM permitted on a single cart.

A further requirement for all carts and trucks is specified in UFC Section 51.108(c)4, which declares that they shall be marked to indicate the contents therein and non-compatible materials shall not be transported on the same cart or truck. Transport in a cart should be limited only to those chemicals within the following classes: Toxic, Acid, Base (Alkaline), Flammable (includes Combustible), Oxidizer, Water Reactive, Pyrophoric.

UFC Section 51.107(c) deals with storage cabinet construction requirements for gases. These requirements are directed primarily to those cabinets permanently and fixedly located in either an HPM storage or fabrication area. The requirements include, but are not limited to, metal construction, internal container restraints, gas monitoring, leakage containment, self closing, sealing and latching doors, fire protection rating, separation and isolation of incompatible materials and full inclosure of all containers.

Other than what has been discussed above, little attention has been given to special, individual requirements for containers or carts for the transport of HPM in exit or service corridors.

It is apparent from the above discussion that prior art has not been particularly concerned with on site HPM transport methods safety and the semiconductor and microcircuit industries have not felt compelled either by law or self interest to improve old methods or devise new ones for the safe transport of hazardous materials within plant boundaries.

However, as seen above, the most recent UBC/UFC Design Guide and various state and local enforcement agencies are addressing the problems of on site and within building transport safety for HPM.

The purpose of this invention is to provide a safe, simple, convenient system for transporting small quantities of toxic and hazardous materials, particularly gases, between plant storage areas and working areas, using appropriate service and exit corridors. More particularly, this invention will fulfill the new code requirements for container restraint, an implied need for container enclosure and a unique ability to continuously monitor gas containers and detect and warn of leaks, while they are being transported between storage and work areas.

SUMMARY OF THE INVENTION

The present invention has been developed to respond to the special needs of the semiconductor and microcircuit industries for the safe, on-site, in-building transport of hazardous and toxic materials, especially gases, in exit and service corridors, for laboratory, research and production uses. The invention has also been developed to fulfill the express Uniform Building and Uniform Fire Code requirements for carrier dimensions, container restraint, the implied requirement for container enclosure and isolation, and to anticipate the unique need for continuous monitoring and warning of leaks of toxic and hazardous gases while the containers are being transported between storage and work areas and within exit and service corridors.

The present invention utilizes a manually operated cylinder cart of conventional design, with rear-extended swiveling and locking casters to provide complete support with operator assistance. The cart is made of all metal welded tubing and rolls on multiple larger mold-on rubber ball bearing wheels in the front and multiple smaller soft rubber swivel casters on the rear. When in operating position, the leading face of the cart inclines in a rearward direction toward the operator at approximately 45° from the vertical plane.

Multiple compartmentalized cabinets of suitable shapes and sizes are separably and removably attached in an adjoining, planar, parallel spaced relationship to the leading face of the cylinder cart. Each of these cabinets is of suitable metal construction and has multiple, conventionally hinged, self closing, sealing and latching covers, of matching dimensions, on the forwardly exposed sides of the cabinets, to permit the insertion and removal of multiple gas cylinders of various known dimensions, designs and materials. Each of these cabinets contains multiple conventional metal brackets of known design and material to hold, secure and separate multiple conventional gas cylinders such as those commonly made for containment of toxic and hazardous gases used for laboratory, research and production in the semiconductor and microcircuit industries.

The present invention includes, in a unique manner to be described, a means to continuously monitor the gas cabinets and gas containers for leaks and to warn promptly of leaks while the cylinder cart is in use. This continuous monitoring is accomplished by the use of a portable, rechargeable battery powered, toxic gas detector of known design, such as the Model TLD-1 Toxic Gas Detector available from MDA Scientific, Inc. of Lincolnshire, Ill. This detector is removably and operably connected in a known manner, by multiple leakproof tubes of known composition, to each of the multiple cabinets containing the cylinders of toxic or hazardous gases. The portable toxic gas detector of known design selected for use with this invention is not limited but preferably should be a flexible, simple to operate instrument, designed to provide reliable, low cost, low maintenance, rechargeable battery powered protection against exposures to a wide variety of toxic, corrosive and pyrophoric gases. Preferably it should be dedicated to detect and measure a specific gas or family of gases, respond quickly to the target gas, yet ignore other commonly used chemicals, thereby eliminate the potential for false or delayed alarms. It should operate for portable direct reading and provide continuous (several hours) unattended service, even allowing operation from the battery charger if it becomes necessary to leave the loaded delivery cart in a storage, fabrication or other use area. It should have pre-set audible, electrical or visual alarm levels and be able to respond quickly to hazardous leaks and releases.

When the cylinder cart is in use and the toxic gas monitor is operating, the sealably closed and latched covers on the gas cabinets permit the detector to create a slightly negative pressure inside the cabinets. If a gas container in any of the cabinets should leak or release gas, it will flow to the toxic gas detector which will detect the leak immediately and respond promptly with an appropriate alarm or signal. Gas sampling points will be located at both lower and upper positions within each compartment to detect gases heavier and lighter than air. This will permit the cylinder cart operator to take appropriate protective measures for self, other personnel and the environment.

This ability to monitor, detect and warn of leaks of toxic or hazardous materials while in transit between storage and work areas and in exit or service corridors of laboratory, research and production facilities is the unique and original feature of this invention and promotes and ensures safe transport of hazardous production materials in such facilities.

BRIEF DESCRIPTION OF THE DRAWINGS

The features and advantages of the present invention are best understood from the detailed description when read in reference to the accompanying drawing, wherein.

DETAILED DESCRIPTION OF THE PREFERRED EMBODIMENT

Figure 1:
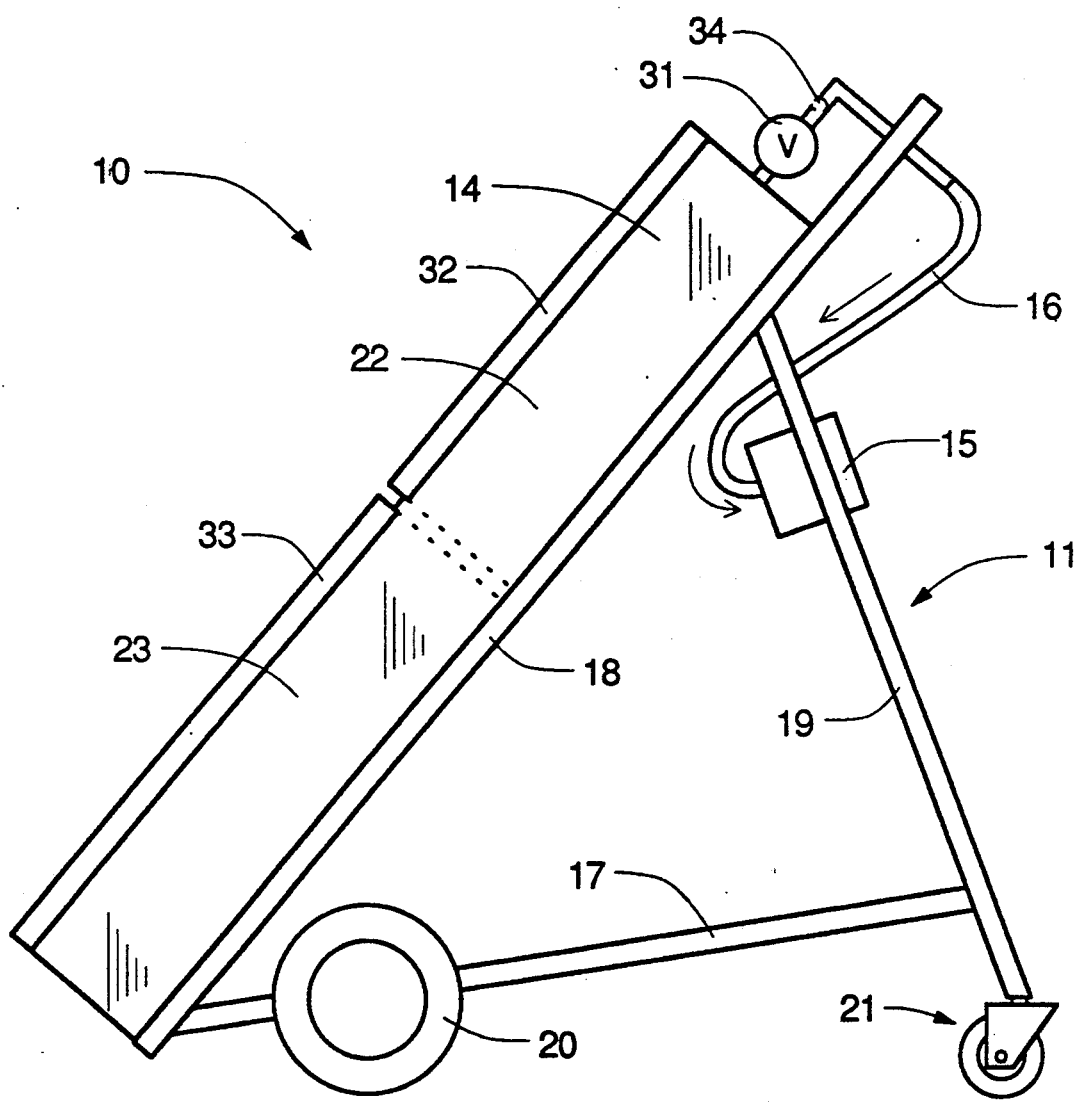
FIG. 1 is a simplified schematic representation of the delivery cart with the gas cabinets, monitoring equipment and the interconnecting valves and tubing in place.

Referring to FIG. 1 there is shown a schematic drawing of the portable gas cylinder safety delivery system forming the present invention and which is generally designated by the reference numeral 10.

As shown and to be described in detail, the safety delivery system consists of a cylinder delivery cart means 11 which removably holds and supports multiple, removable, compartmentalized gas cabinet means 14 and, removable, portable, rechargeable battery operated continuous toxic gas monitor means 15 which is removably, operably and multiply connected by multiple, tubing means 16 to said gas cabinet means 14.

The cylinder delivery cart means 11 is of conventional design, not a part of this invention and consists of an open frame formed of multiple tubular metal sections of suitable lengths, not shown, held permanently by known means, in parallel spaced relationship to themselves, along the length of the section. When viewed from the side, such as in FIG. 1, the delivery cart forms a closed, generally triangular shape, with the base of the triangle being the generally horizontally disposed base 17 of the cart, the long side of the triangle being the leading face 18 of the cart. The third side of the triangle forms the generally vertically disposed, back side 19, to provide strength and support. The angle between the base and the leading face is approximately 45°. The cart rolls on multiple larger, mold-on rubber, ball bearing wheels 20, of conventional design, removably and axially mounted in parallel spaced relationship, on each opposing side of the front of the base 17 and multiple smaller, rubber, swiveling, self-locking casters 21, of known design, removably mounted axially in a parallel spaced relationship, on each opposing side of the rear of the base 17. All wheels are mounted in a known manner to allow easy maneuverability of the cart in a horizontal plane.

On the leading face of the cart multiple metal, compartmentalized gas container cabinets 14, of conventional fire safety rated design, are removably attached in a known manner and in adjacent, planar relationship to each other. Each cabinet has hingably attached to its frontside, in a known manner, a conventional metal cover 32, 33 of individual matching dimensions for each compartment 22, 23 respectively and each of which is movably self closing, self sealing and self latching in a known manner, not shown and not a part of this invention.

Figure 2:
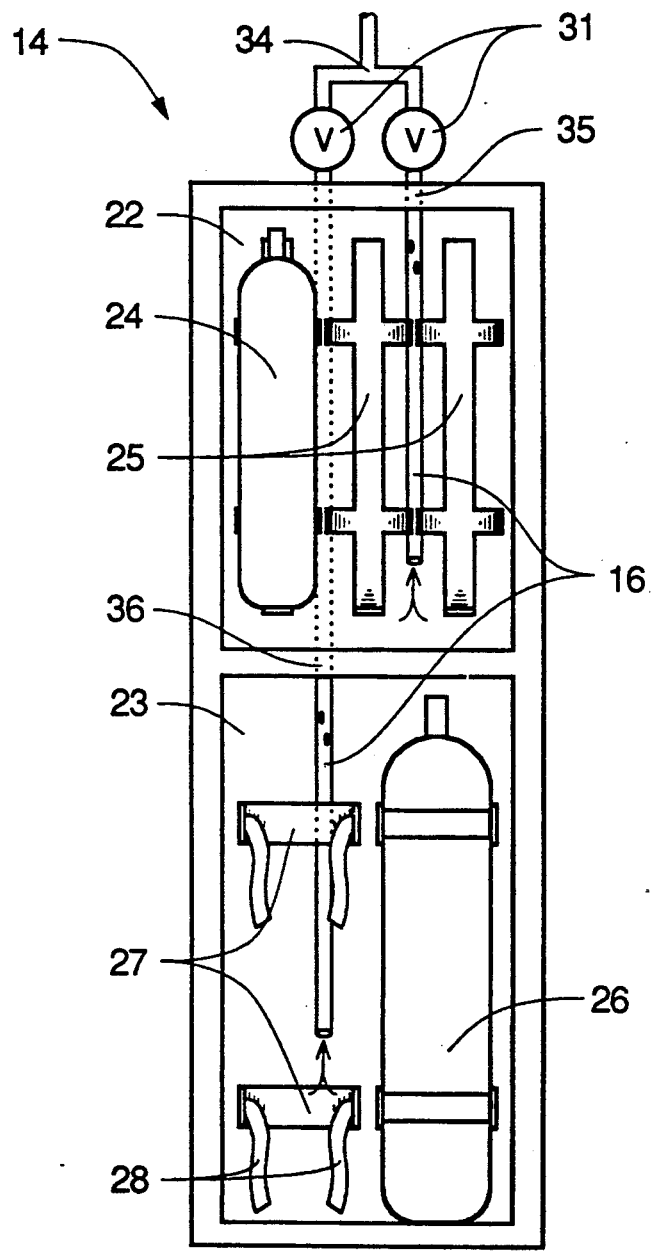
FIG. 2 is a front view of a typical compartmentalized gas cabinet used to contain small type toxic gas containers.

More specifically, gas cabinet 14, upper storage compartment 22, as shown in FIG. 2, is of generally rectangular, box shape, having parallel sides, a parallel top and bottom and is of sufficient internal dimension to contain and enclose multiple pressurized gas cylinders of the type commonly known as "lecturn or lecture bottles" 24, in planar, parallel spaced relationship and individually and removably secured in position by appropriate retaining clamps 25, of known design, not shown, which are fixedly attached in a known manner to the interior back side of the cabinet 14 to so hold the gas cylinders therein.

Also more specifically gas cabinet 14, lower storage compartment 23 has internal dimensions that are selected to contain and enclose multiple large pressurized gas cylinders 26, each of a size not to exceed 5½" diameter and 18" length and a filled weight of 25 pounds. These cylinders will be removably positioned and secured in a known manner by retaining brackets 27 and by retaining straps 28 of known design, not shown.

As seen in FIG. 1, on the back, vertical leg 19 of cylinder cart 11 located and removably mounted, in a known manner and with controls and dials easily visible and accessible to the cart operator, is the portable, rechargeable battery powered, continuously monitoring, toxic gas monitor 15, of known construction and design. Said toxic gas monitor is selected to provide protection against a wide variety of toxic, corrosive, and pyrophoric gases. These gases include, but are not limited to Ammonia, Bromine, Chlorine, Diisocyanates such as CHDI, HDI, NMDI, IPDI, MDI, NDI, PPDI, TDI, TMDI, Hydrazines such as NMH, $N_2H_4$, UDMH, Hydrides such as Arsine, Diborane, Disilane, Germane, Hydrogen Selenide, Phosphine, Silane, Stibine, Hydrogen Cyanide, Hydrogen Sulfide, Mineral Acids such as Hydrogen Chloride, Hydrogen Flouride, Nitric Acid and Sulfuric Acid, Nitrogen Dioxide, Ozone, Phosgene, Sulfur Dioxide.

The toxic gas monitor 15 should be able to detect and measure a specific gas or family of gases, respond quickly to the target gas and ignore other commonly used chemicals. The Model TLD-1 Toxic Gas Detector manufactured by MDA Scientific, Inc. of Lincolnshire, Ill., is used in this preferred embodiment of this invention and is able to perform all of the above named measurements. The gas monitor is also factory programmed to give an electrical, audible or visual alarm for a particular concentration of a particular toxic, corrosive or pyrophoric gas at 1 or 2 times the Threshold Limit Value (defined in UFC) in most cases. The portable model used also shows gas concentration on a digital display, not shown, which is visible to the operator of the cylinder delivery cart 11.

As seen in FIGS. 1 and 2, between the toxic gas monitor and the multiple gas storage cabinets 14 are extended multiple gas tight tubing lines 16, of known composition, suitable lengths, diameters and design. One end of the tubing is removably and fluidly connected to the intake side of the gas monitor 15. The other end is removably and fluidly connected in a known manner to a suitable manifold 34, of known design, not shown.

Manifold 34 is removably and fluidly connected to multiple valves 31 of know design. These multiple valves 31 are removably and fluidly connected in a known manner, not shown, by means of multiple gas tight tubing 16, to upper compartment exhaust port 35 and lower compartment exhaust port 36, respectively. Exhaust port 35 is located in the top side of upper compartment 22 and allows the escape through multiple tubing 16 of any gases which might leak or be released from multiple cylinders 24. Similarly exhaust port 36 is located on the upper rear wall of lower compartment 23 and allows the escape through multiple tubing 16 of any gases which might leak or be released from multiple cylinders 26.

Inside upper compartment 22 multiple tubing 16 is removably and fluidly connected in a known manner, not shown, to exhaust port 35 and allowed to extend its open end to near the bottom, opposing side, of upper compartment 22. In the preferred embodiment this bottom is the wall which divides the upper 22 and lower 23 compartments.

Inside lower compartment 23 multiple tubing 16 is removably and fluidly connected in a known manner, not shown, to exhaust port 36 and allowed to extend its open end to near the bottom of lower compartment 23. In the preferred embodiment, this is the bottom of the gas storage cabinet and the wall parallel to and opposing the wall dividing the upper 22 and lower 23 compartments.

The multiple connecting lines 16 between the gas monitor and the multiple compartmentalized gas storage cabinets, with the incorporated valve system, will permit the isolation of the atmospheres of the multiple cabinets from each other and the identification of any cabinet containing a leaking cylinder. As mentioned, the multiple tubes 16 which extend into the upper 22 and lower 23 storage compartments respectively, are open on the exposed ends which reach to near the bottom of their respective compartments. Each tube also has multiple perforations at a point within and near the top of its respective compartment. Thus the lower, open ends of the tube permit sampling and monitoring by the gas monitor of those gases which may be heavier than air. The perforations in the tubes near the top of their respective compartments permit sampling and monitoring of those gases which may be lighter than air.

When the compartmentalized gas storage cabinets on the gas cylinder delivery cart are loaded with gas cylinders containing toxic gases and the cabinet covers are closed, sealed and latched, the toxic gas monitor then is switched on. The small pump, not shown, within the gas monitor then creates a slightly negative pressure within the sealed gas cabinet compartments. If a toxic gas leaks or is released from a cylinder in one of the compartments, the gas immediately flows to and is detected by the gas monitor, which will show the concentration level on the digital display, not shown, of the monitor and will send an appropriate alarm when a preset level is exceeded. This will allow the cart operator or other personnel to take proper protective measures.

The present invention has been fully described in a preferred embodiment but many modifications and variations may become apparent to those skilled in the art. However, the scope of the present invention is not limited by the above described details but only by the terms of the appended claims.

We claim:

1. A mobile safe containment and leak detection system for the transport and continuous monitoring of multiple portable pressurized gas cylinders, said mobile system comprising:
   a) a plurality of containers having integral bottoms and sidewalls, with covers hingably and sealably attached thereto which are self closing and self latching, to enclose fully said portable gas cylinders and to confine any gases leaking therefrom and to resist fires and explosions;
   b) each of said plurality of containers having a plurality of individual, internal, adjustable positioning and restraining means to allow individual placement and removal of said individual gas cylinders and prevent their accidental displacement during movement of said mobile system;
   c) each of said plurality of containers having a plurality of integral gas exhaust ports fluidly connected to valves which are removably, operably and fluidly connected to a portable gas detection instrument to permit passage of leaking gases to said instrument;
   d) a portable gas detection instrument of known design to continuously and selectively detect, identify and warn of gases escaping from any of said plurality of gas cylinders within said containers; and
   e) a wheeled cart of known design having movement and direction control which supports and to which are removably and operably attached said plurality of containers and said portable leak detection instrument, to enable the safe transport of multiple pressurized gas cylinders while they are being monitored continuously for gas leaks.

2. A mobile safe containment and leak detection system for the transport and continuous monitoring of multiple portable pressurized gas cylinders, said mobile system comprising:
   a) a plurality of metal containers having integral bottoms and sidewalls, with covers hingably and sealably attached thereto and serving to contain a plurality of pressurized gas cylinders, confine any gases leaking therefrom, resist fires and restrict explosions;
   b) said metal covers are self closing and self latching to automatically confine said gas cylinders and prevent their accidental displacement during transport;
   c) said containers having a plurality of integral, internal, adjustable positioning and restraining means to hold individually and securely said gas cylinders, to prevent their unintended dislodgment within said metal containers during movement of said mobile system;
   d) each of said metal containers has a plurality of integral exhaust ports removably, operably and fluidly attached to a plurality of valves which, in turn, are removably, operably, and fluidly attached to a portable gas detection instrument to permit passage of leaking gases to said instrument;
   e) a portable gas detection instrument of known design, able to operable selectively from both an external power source and an internal, self container power source, serving to continuously detect, identify and warn of gases leaking from pressurized gas cylinders within said metal containers during both stationary and moving operation of said mobile system; and
   f) a wheeled cart of known design, having movement and direction control which supports and to which are operably and removably attached said plurality of metal containers and said portable leak detection instrument to enable the safe containment and transport of multiple portable pressurized gas cylinders while they are being monitored for gas leaks.

* * * * *